United States Patent
Choi et al.

(10) Patent No.: US 7,603,477 B2
(45) Date of Patent: Oct. 13, 2009

(54) METHOD OF FORMING A LOCAL MOBILITY DOMAIN AND A LOCAL MOBILITY AGENT AND SYSTEM AND APPARATUS THEREOF

(75) Inventors: Jin-hyeock Choi, Bundang-gu Seongnam (KR); Woo-shik Kang, Paldal-gu Suwon (KR); Hyo-sun Hwang, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 750 days.

(21) Appl. No.: 10/206,194

(22) Filed: Jul. 29, 2002

(65) Prior Publication Data

US 2003/0035390 A1 Feb. 20, 2003

(30) Foreign Application Priority Data

Jul. 27, 2001 (KR) .......................... 2001-0045485

(51) Int. Cl.
*G06F 15/173* (2006.01)

(52) U.S. Cl. ...................... 709/238; 709/223; 709/227; 709/229; 370/331

(58) Field of Classification Search ................ 709/242, 709/200, 227, 229, 238, 223; 370/329, 331, 370/349, 328
See application file for complete search history.

(56) References Cited

U.S. PATENT DOCUMENTS

| | | | | |
|---|---|---|---|---|
| 5,572,528 | A * | 11/1996 | Shuen | 370/338 |
| 6,763,007 | B1 * | 7/2004 | La Porta et al. | 370/331 |
| 6,842,462 | B1 * | 1/2005 | Ramjee et al. | 370/328 |
| 6,973,313 | B1 * | 12/2005 | Sebastian | 455/432.1 |
| 6,992,995 | B2 * | 1/2006 | Agrawal et al. | 370/328 |
| 7,203,492 | B2 * | 4/2007 | Momona | 455/432.1 |
| 7,269,657 | B1 * | 9/2007 | Alexander et al. | 709/229 |
| 7,277,948 | B2 * | 10/2007 | Igarashi et al. | 709/227 |
| 2001/0046223 | A1 * | 11/2001 | Malki et al. | 370/338 |
| 2004/0136348 | A1 * | 7/2004 | Han | 370/338 |
| 2005/0036501 | A1 * | 2/2005 | Chung et al. | 370/401 |
| 2005/0120136 | A1 * | 6/2005 | Park et al. | 709/242 |

(Continued)

OTHER PUBLICATIONS

Ramjee et al, "Hawaii: Domain Based Approach for Supporting Mobility in Wireless WAN", ICNP, 1999.*

(Continued)

*Primary Examiner*—Ramy Mohamed Osman
(74) *Attorney, Agent, or Firm*—Lee & Morse P.C.

(57) ABSTRACT

An automated system and method of establishing a local mobility domain (LMD) and a local mobility agent (LMA) on a mobile terminal node (MN) using Internet Protocol version (IPv6) preferably includes: establishing within the MN a newly contacted access router (AR) as the LMA and then receiving from the LMA and storing a list of neighboring ARs, which comprise the LMD. Each AR contains a stored list of neighboring ARs that are within a predetermined range of the AR, which is dynamically set by a network manager. The MN registers a retrieved local and regional address with both the LMA and a home agent (HA.) When the MN moves to a new AR, the stored list of the new AR is checked for the present LMA. The LMA is only changed to the new AR and re-registered with the HA if the new AR is in a different LMD.

15 Claims, 8 Drawing Sheets

U.S. PATENT DOCUMENTS

2008/0008088 A1* 1/2008 Nagarajan et al. ........... 370/331

OTHER PUBLICATIONS

Motorola, "Method to Prevent Unnecessary Transmission of Packets from a Local Mobility Agent to a Mobile Node", www.ip.com, ip.com# IPCOM000007189D, Mar. 4, 2002.*

Soliman, et al. * IETF Mobile IP Working Group—Internet Draft, pp. 1-16, (Sep. 13, 2000) *Entitled: Hierarchial MIPv6 mobility management.

Perkins, et al.  Proceedings IEEE Intnl Symp. on Computers & Communications (Jul. 6, 1999) pp. 340-346 Entitled: "Optimized smooth handoffs in Mobile IP".

Soliman, et al., "Hierarchial MIPv6 mobility management", Network Working Group, Internet—Draft, 14 pages (Sep. 2000).

* cited by examiner

METHOD OF FORMING A LOCAL MOBILITY DOMAIN AND A LOCAL MOBILITY AGENT AND SYSTEM AND APPARATUS THEREOF

BACKGROUND OF THE INVENTION

1. Field of the Invention

The present invention relates to a method of forming a local mobility domain (LMD) and a local mobility agent (LMA). More particularly, the present invention relates to a method of forming an LMD and an LMA based on Mobile IP and an apparatus thereof.

2. Description of the Related Art

As the Internet has grown and as users have become more interested in mobile Internet access, the number of available IP addresses for network devices is decreasing. With drawbacks of the existing IPv4 becoming more evident, a new protocol, known as IPv6, has been defined.

Conventional mobile terminals, having access to the Internet under IPv6, each have a fixed home address and a home agent (HA). When the mobile terminal moves to a network other than the home network, the mobile terminal receives a care-of-address (COA), which represents a new location of the mobile terminal.

Figure 1:
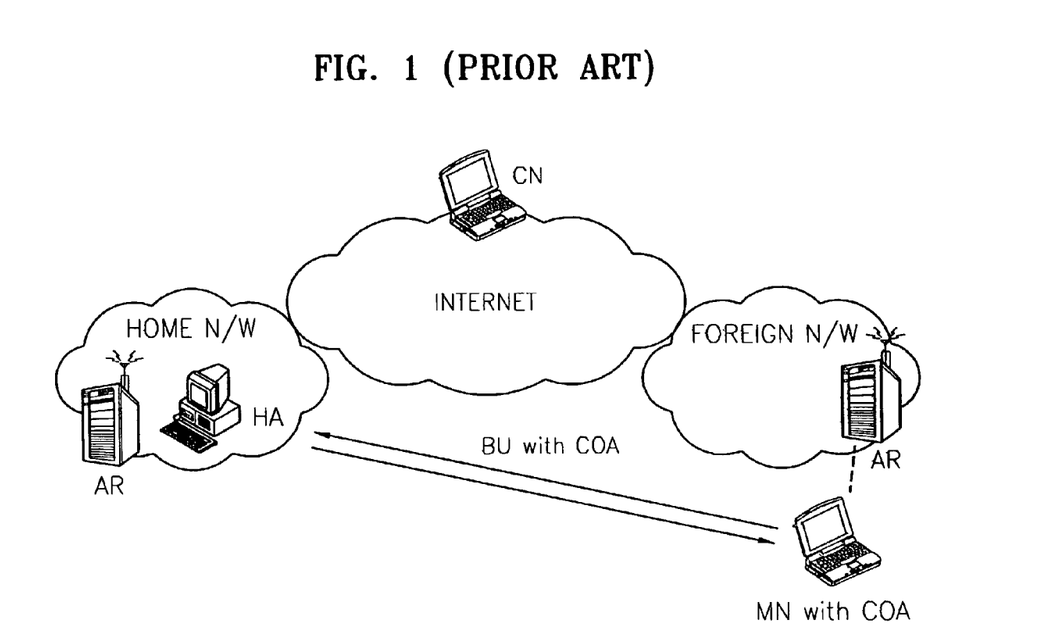
FIG. 1 illustrates a conventional system implementation for registering a mobile terminal using IPv6.
Figure 2:
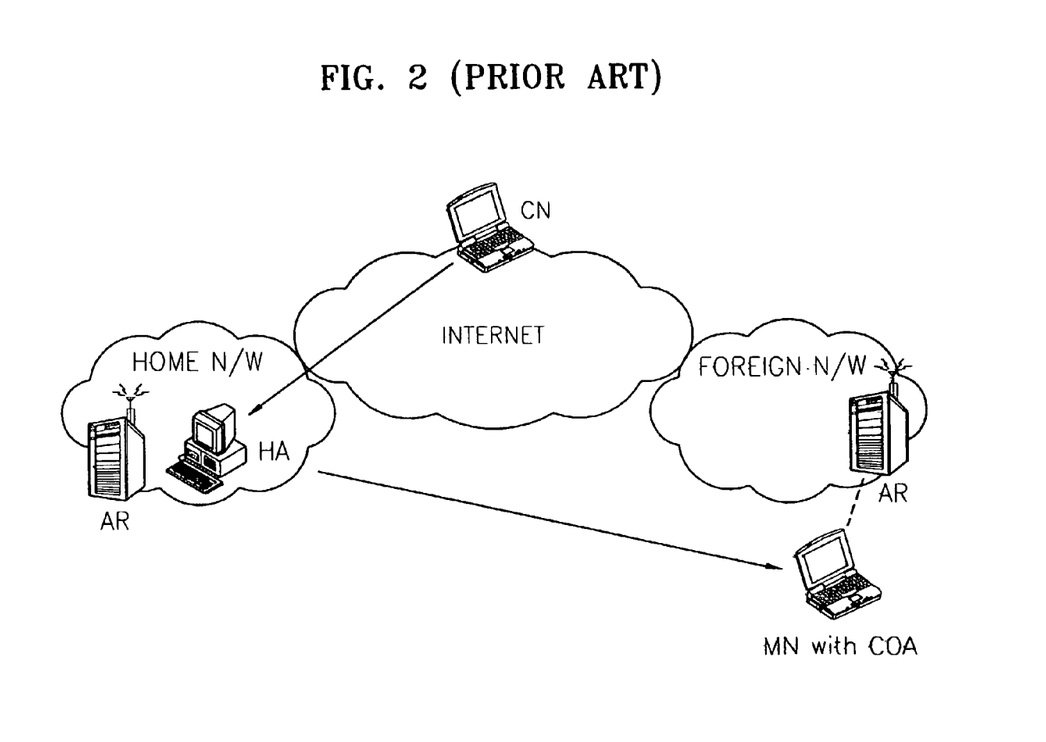
FIG. 2 illustrates conventional data transfer paths when using a mobile terminal.
Figure 3:
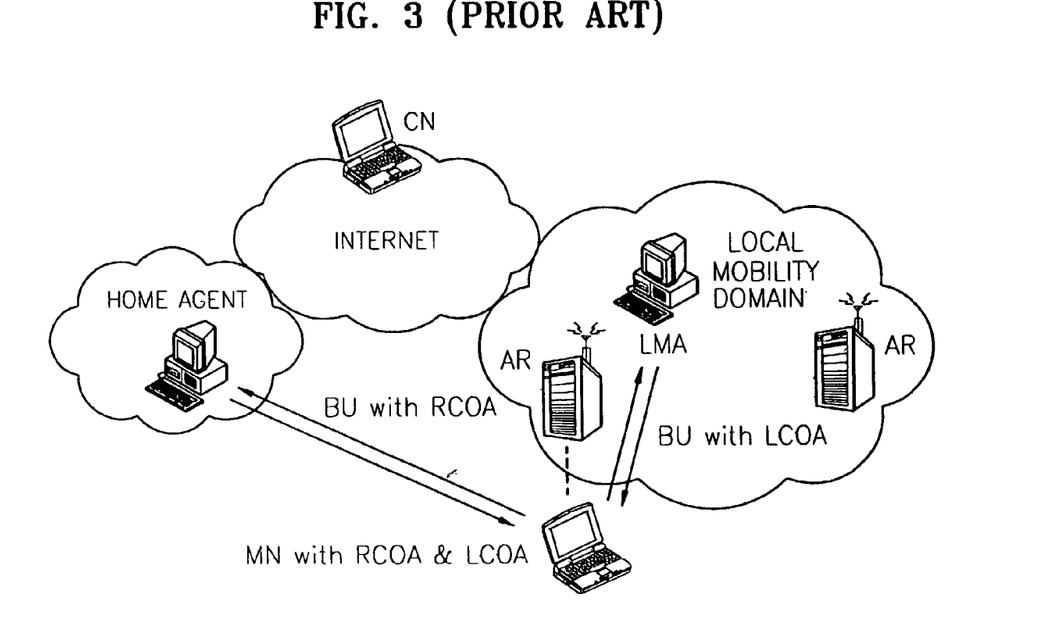
FIG. 3 illustrates communication paths for registering in a conventional localized mobility management system.

Referring to a conventional system shown in FIGS. 1 and 2, a mobile node (MN) reports the care-of-address to a home agent. Thereafter, data targeting the MN is input to the home network of the MN where it is received by the HA and transferred to the COA for the MN. In the following figures, the abbreviations AR, CN, MN, and BU denote an access router, a correspondent node, a mobile node, and a binding update, respectively.

In the case that the home network (HOME N/W) is far from a present network, such as the foreign networks (FOREIGN N/W) indicated in FIGS. 1 and 2, it is inconvenient to register every movement of the MN to the HA. For such cases, each network is divided into LMDs, each domain containing an LMA, which operates as a local HA. In an LMD, the MN receives a regional care-of-address (RCOA) and a local care-of-address (LCOA). In this case, the RCOA represents the location of the LMA in the LMD, and the LCOA represents the present location of the MN.

Figure 4:
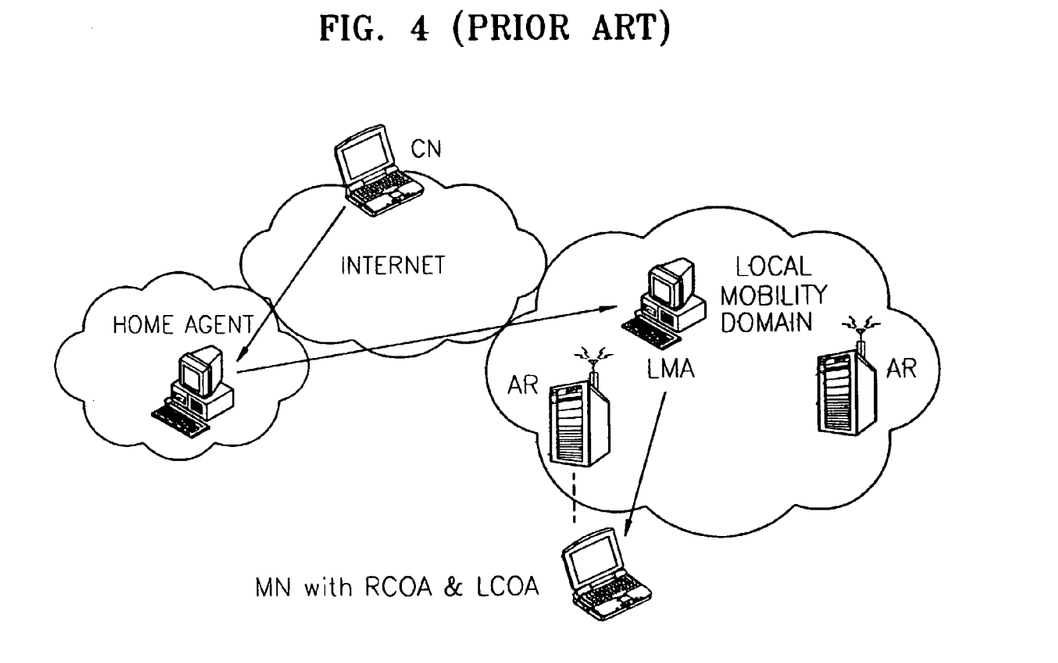
FIG. 4 illustrates communication paths for transferring localized mobility management data.
Figure 5:
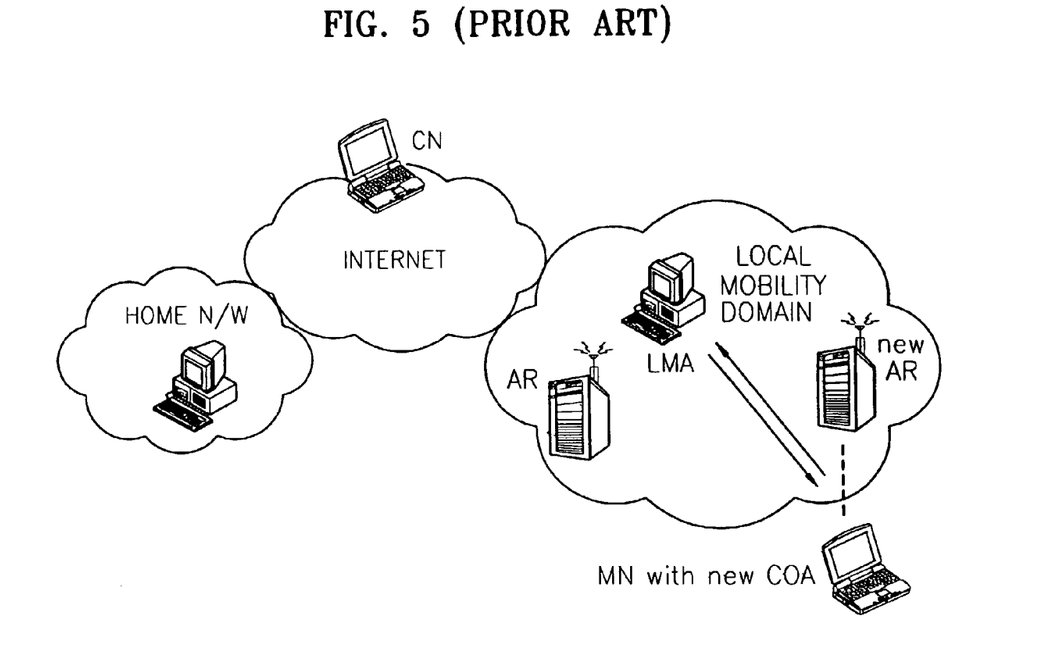
FIG. 5 illustrates a method of registering in a conventional localized mobility management system when a mobile node (MN) is moving.
Figure 6:
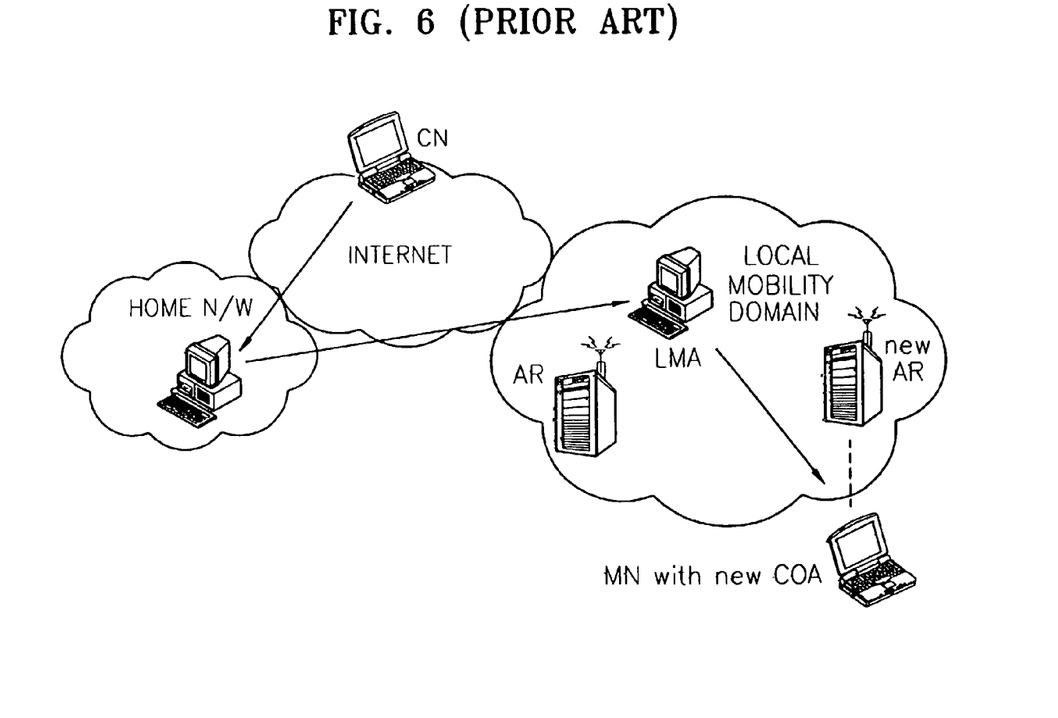
FIG. 6 illustrates communication paths for transferring data in a conventional localized mobility management system when the MN is moving.

With reference to FIGS. 3 through 6, an MN registers a present location and the location of a present LMA to a home LMA and the HA, respectively. When data targeting the MN is input to the home network, the HA sends the data to the present LMA of the MN and the present LMA transfers the data to the MN, as shown in FIG. 4. If the MN moves within the LMD, the MN registers a new location to the home LMA, as shown in FIG. 5. The data transferred to the MN is transferred through the HA, the new LMA, and a new access router (AR), as shown in FIG. 6.

According to a conventional protocol, a network manager establishes the LMD and LMA. However, since it is difficult to correct the LMD according to changes of the networks, the LMA may become the point of failure for the entire network.

SUMMARY OF THE INVENTION

In an effort to solve the above-described problems, it is a feature of an embodiment of the present invention to provide a method and apparatus for establishing a local mobility domain (LMD) and a local mobility agent (LMA) according to a movement of a mobile node (MN).

According to an embodiment of the present invention, a method of forming an LMD preferably includes: (a) establishing a hop-count from a center router (CR) for a predetermined value; (b) generating a list of access routers (ARs) within a domain defined by the established hop-count while surrounding a predetermined AR; and (c) establishing the ARs included in the list as an LMD, which has the predetermined AR as the CR.

According to another embodiment of the present invention, a method of forming a LMA preferably includes: (a) establishing an LMD; and (b) establishing an AR to which an MN has a first access as the LMA in order to register a local care-of-address (LCOA) and a regional care-of-address (RCOA) to a home agent (HA) and the LMA, when the MN has accessed a predetermined LMD. Preferably, the method of forming the LMA may further include: (c) determining the existence of the LMA in an LMD list of the AR, which the MN has newly accessed, to register a new LCOA to the LMA, when the MN moves. Here, (c) may further include establishing the AR, which the MN has newly accessed, as a new LMA to register new LCOA and RCOA to the HA and the new LMA, respectively, when the LMA is absent from the LMD list of the AR, which the MN has newly accessed. The method of forming the LMA may further include: (d) establishing the present AR as a new LMA to register a new LCOA and RCOA to the HA and the new LMA, respectively, when the MN exceeds a predetermined binding lifetime and a number of binding update messages (BUM) exceeds a predetermined value. The foregoing methods, individually and in combination are preferably operated under control of a computer using a stored program.

In a system for implementing the foregoing methods, a router preferably includes: a hop-count establishment unit for receiving and storing a hop-count; an LMD list generation unit for generating and storing a list of the neighboring routers, which have a hop-count from the router of less than a predetermined value, thereby defining an LMD; and an address management unit for receiving and storing an RCOA and an LCOA from an MN in the case that the router is established as the LMA. In an embodiment of the present invention, an MN preferably includes: an LMA control unit for deciding whether to establish a present AR to which an MN has an access as an LMA and for receiving and storing a list of the AR established as the LMA; an address register unit for registering an RCOA and an LCOA to an HA and the LMA, respectively; and an LMA service time adjustment unit for establishing the present AR to which the MN has an access as a new LMA when a binding lifetime has passed and a number of BUMs exceeds a predetermined value.

According to an embodiment of the present invention, a system for establishing an LMA and an LMD preferably includes a router and an MN. In this embodiment, the router preferably includes: a hop-count establishment unit for receiving and storing a hop-count; a LMD list generation unit for establishing routers within a domain, which has a hop-count less than a predetermined value from a router, as an LMD to generate and store a list of the routers within the LMD; and an address management unit for receiving and storing an RCOA and an LCOA from the MN in the case that the router is established as the LMA. The MN preferably includes: an LMA control unit for deciding whether to establish the present router to which the MN has an access as the LMA and for receiving and storing a list of the routers established as the LMA; an address register unit for registering the RCOA and the LCOA to an HA and the LMA, respectively; and an LMA service time adjustment unit for establishing the present routers to which the MN has an access as a new LMA when a binding lifetime has passed and a number of BUMs exceeds a predetermined value.

Further features of the present invention will become apparent from a description of the fabrication process and a structure resulting therefrom, taken in conjunction with the accompanying drawings of the preferred embodiment of the invention. The disclosed preferred embodiments, however, should not be taken to be limiting on the present invention.

These and other features and aspects of the present invention will be readily apparent to those of ordinary skill in the art upon review of the detailed description that follows.

BRIEF DESCRIPTION OF THE DRAWINGS

The above features and advantages of the present invention will become more apparent to those skilled in the art by describing in detail preferred embodiments thereof with reference to the attached drawings in which.

DETAILED DESCRIPTION OF THE INVENTION

Korean Patent Application No. 2001-45485, filed Jul. 27, 2001, and entitled "Method of Forming a Local Mobility Domain and a Local Mobility Agent and Apparatus Thereof," is incorporated by reference herein in its entirety.

The present invention will be described with reference to attached drawings. As described above, abbreviations AR, CN, MN, BU, COA, RCOA, LCOA, and LMD denote an access router, a correspondent node, a mobile node, a binding update, a care-of-address, a regional care-of-address, a local care-of-address, and a local mobility domain, respectively.

Figure 7:
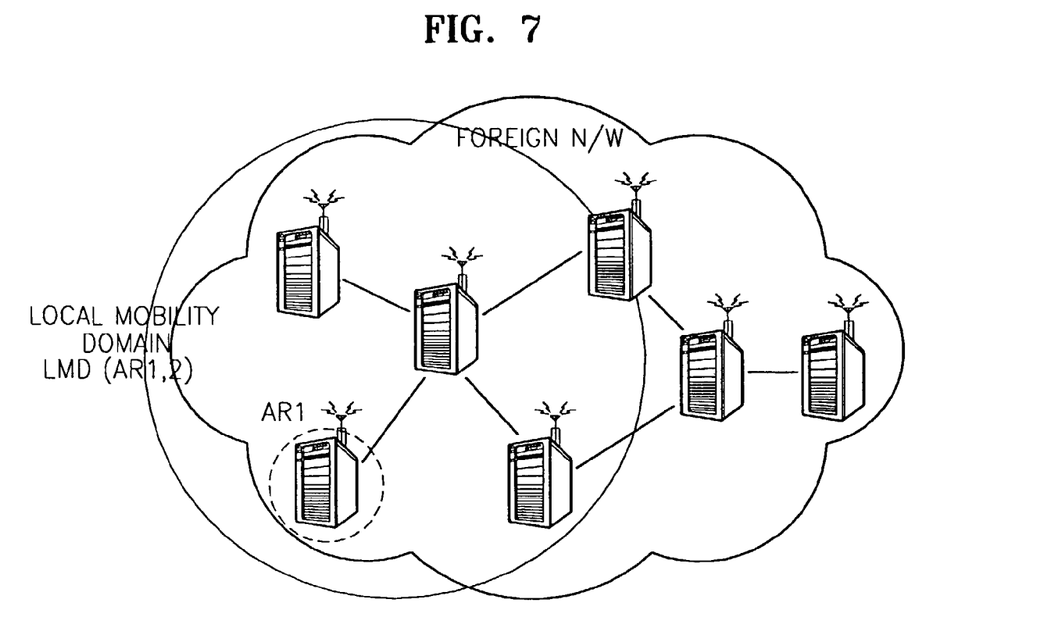
FIG. 7 illustrates a local mobility domain (LMD) according to an embodiment of the present invention.

FIG. 7 illustrates an LMD according to the present invention, which preferably includes a center router and a plurality of routers within a short distance of the center router. The distance between the routers is measured by hop-count. In this case, a hop is a path for transferring a data packet from a router to another router in a packet interchange type network.

The hop-count for transferring one packet to a target position is stored in a packet header in a network, such as that in an Internet network using Transport Communication Protocol/Internet Protocol (TCP/IP).

An LMD may be represented as LMD(CR, N), wherein, CR stands for a center router and N stands for a natural number. Accordingly, the LMD(CR, N) stands for an assemblage of routers that exist within the hop-count of a natural number N from a center router. For example, as shown in FIG. 7, an LMD(AR1, 2) is represented as a circle that surrounds an AR1. The CRs of each LMD become the LMAs of the LMDs. For example, the AR1 in the LMD(AR1, 2) becomes the LMA as shown in FIG. 7.

A network manager establishes the natural number N to select the size of the LMD. The network manager may change the natural number N according to the state of the network in order to vary the size of the LMD. After the natural number N is selected, the LMD is firmly fixed by the CR.

Each AR generates an LMD list, which specifies the ARs within a distance that is defined by the natural number N from each AR. Each AR has a different LMD list.

Figure 8:
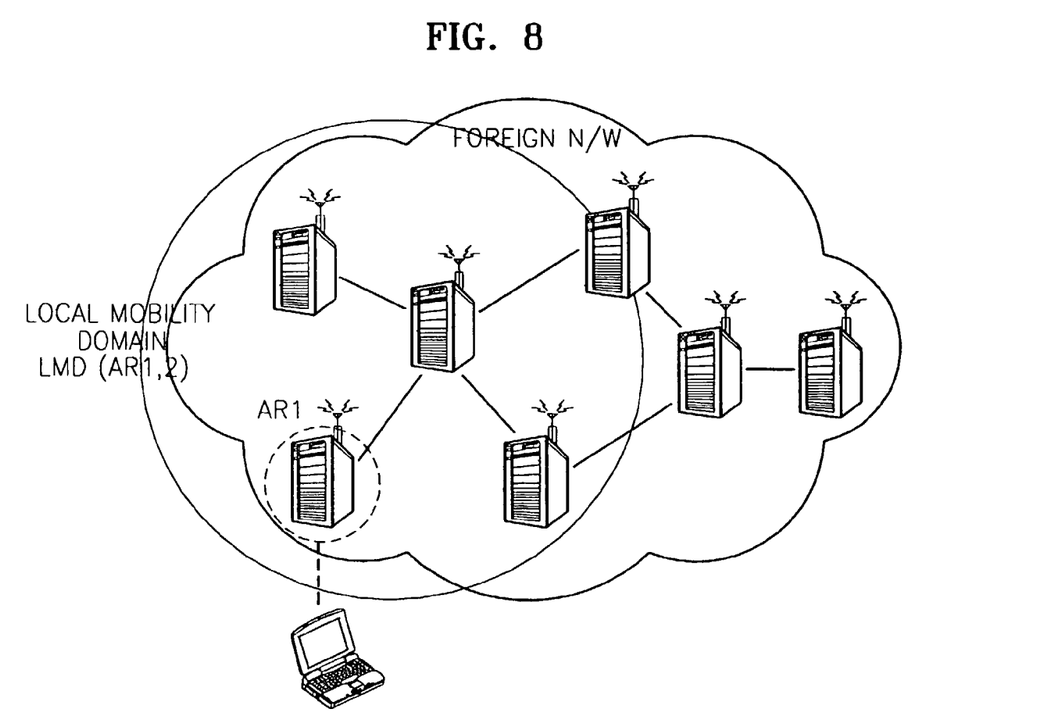
FIG. 8 illustrates a method of constituting an LMD and a local mobility agent (LMA) when a mobile node (MN) has first accessed a network according to an embodiment of the present invention.

FIG. 8 illustrates a method of constituting an LMD and an LMA when the MN has first accessed a network according to the present invention.

When the MN is introduced into a new network, the first AR to which the MN has had a first access becomes a first LMA of the MN. Then, a first LMD is constituted according to the first LMA. The MN registers an LCOA and an RCOA to a home agent (HA) and the first LMA, respectively. Then, data targeting the MN is transferred through the HA and the first LMA.

Figure 9:
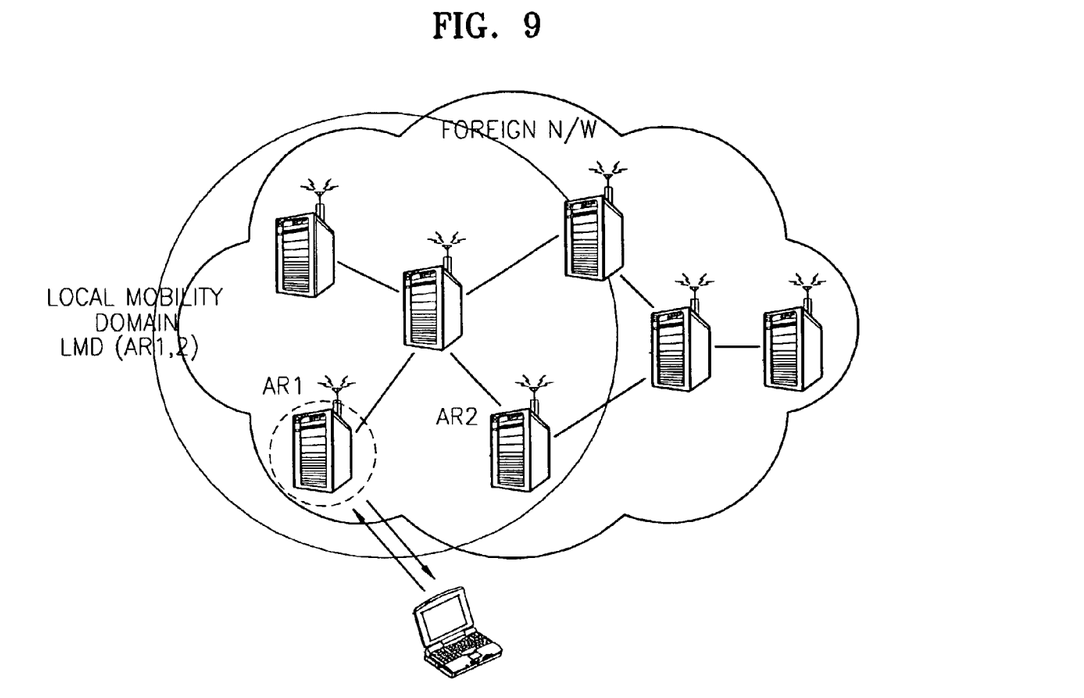
FIG. 9 illustrates a method of constituting an LMD and an LMA when the MN moves within an LMD according to an embodiment of the present invention.

FIG. 9 illustrates a method of constituting an LMD and an LMA when the MN moves within the first LMD according to the present invention.

When the MN moves from the first AR to a second AR, the MN checks for the existence of the first LMA in the LMD list of the new second AR. The existence of the first LMA in the LMD list of the second AR means that the MN has moved within the first LMD, therefore the MN registers a new LCOA to the first LMA.

Figure 10:
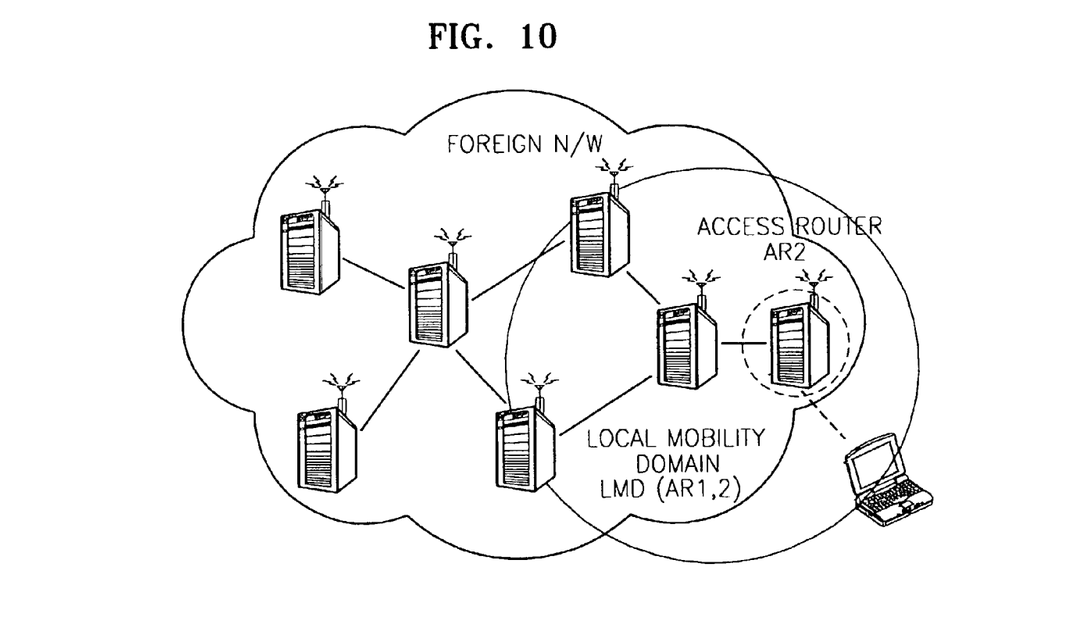
FIG. 10 illustrates a method of constituting an LMD and an LMA when the MN moves out of an LMD according to an embodiment of the present invention.

FIG. 10 illustrates a method of constituting an LMD and an LMA when the MN moves out of an LMD according to the present invention. When the MN moves from the first AR to a third AR, the MN checks for the existence of the first LMA in the LMD list of the third AR. The absence of the first LMA from the LMD list of the third AR means that the MN has moved outside of the first LMD. Consequently, the third AR becomes a new (i.e., a second) LMA, and the MN registers new RCOA and LCOA to the HA and the second LMA, respectively, as in the case where the MN had the first access to the network, as discussed with reference to FIG. 8.

Figure 11:
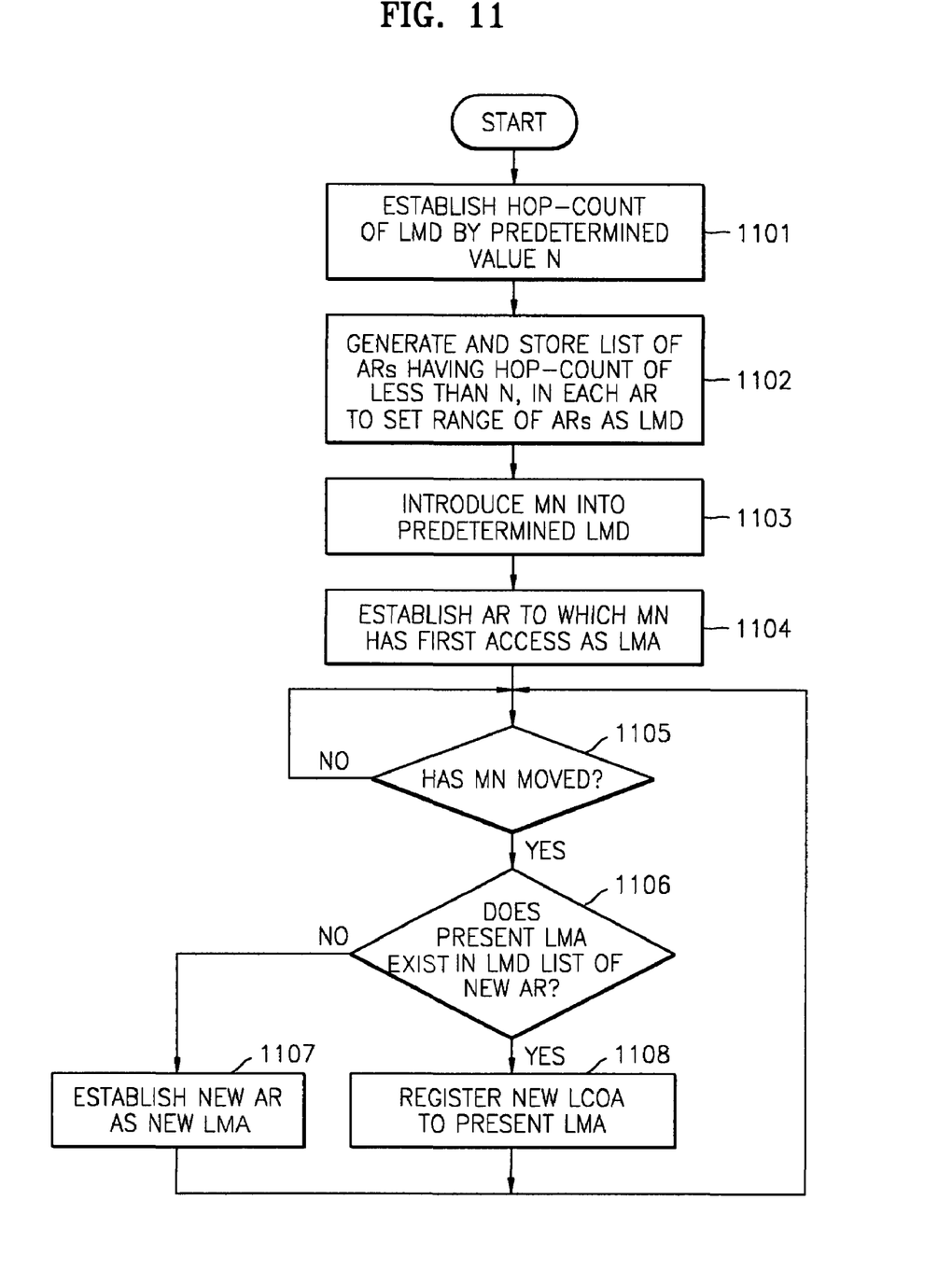
FIG. 11 is a flowchart for explaining a method of forming an LMD and an LMA according to an embodiment of the present invention.

FIG. 11 is a flowchart of a preferred method of forming an LMD and an LMA according to an embodiment of the present invention. In step 1101, a hop-count for LMDs is established by a predetermined value N. In step 1102, for each AR, a list of neighboring ARs having a hop-count less than the value N from the AR is generated and stored to establish an LMD. When an MN has accessed a predetermined LMD in step 1103, the AR to which the MN has had a first access is established as an LMA in order to register an RCOA and an LCOA to an HA and the LMA, respectively, in step 1104. Then, in step 1105, any movement of the MN is checked. In the case that the MN has moved and a new AR has been contacted, in step 1106, the existence of the existing LMA is checked in the LMD list of the new AR. If the present LMA exists in the LMD list of the new AR, in step 1108, the MN registers a new LCOA to the present LMA. In the case that the present LMA is absent from the LMD list of the new AR, the MN establishes the new AR as a new LMA, in step 1107, and registers a new LCOA and RCOA to the HA and the new LMA, respectively. Step 1105 is then repeated. In the case that the MN has not moved, step 1105 is repeated.

Figure 12:
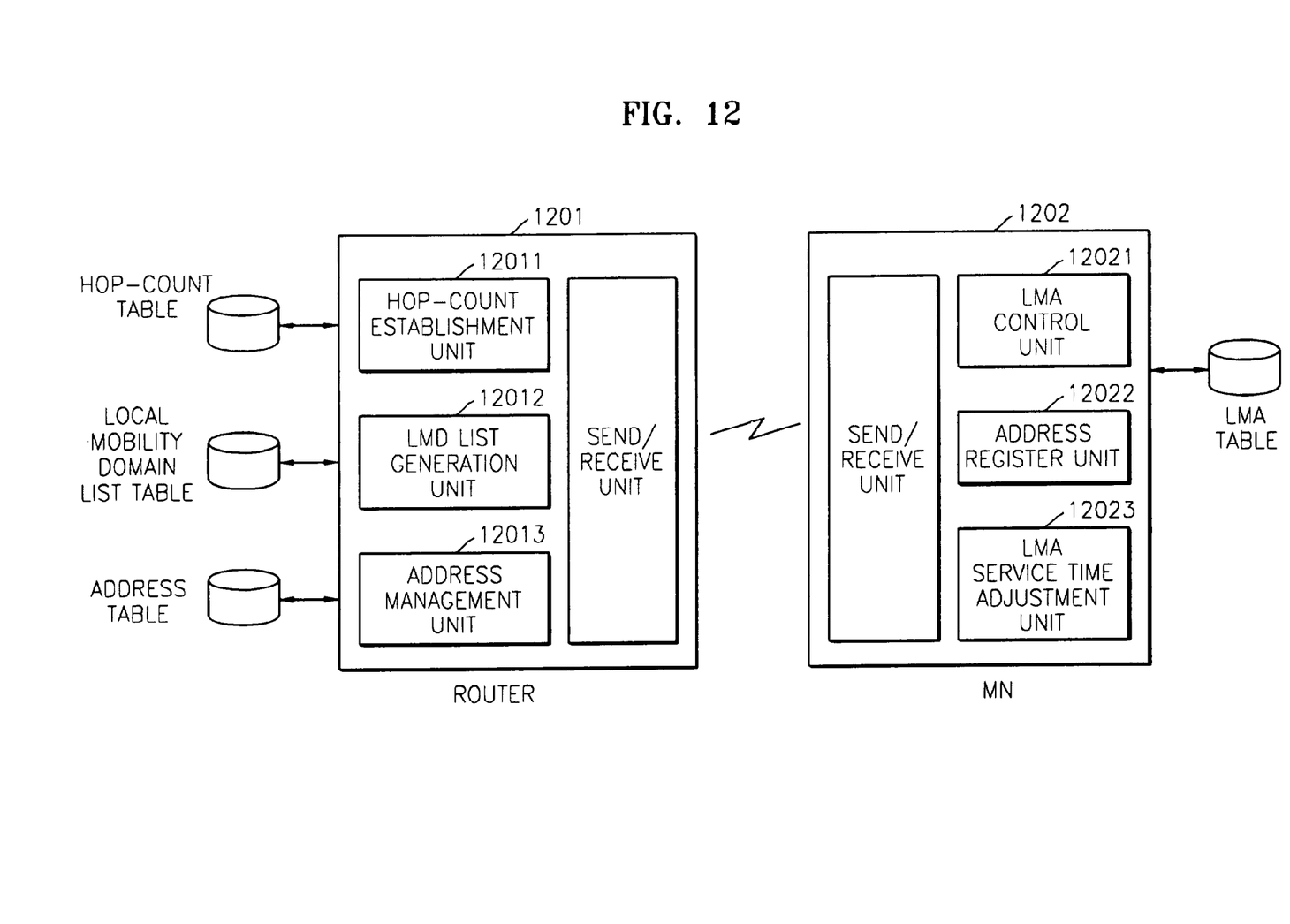
FIG. 12 illustrates a system for establishing an LMA according to an embodiment of the present invention.

FIG. 12 illustrates a preferred embodiment of a system for establishing an LMA according to the present invention. The system includes a router 1201 having a hop-count establishment unit 12011, an LMD list generation unit 12012, and an address management unit 12013, and an MN 1202 having an LMA control unit 12021, an address register unit 12022, and an LMA service time adjustment unit 12023.

In this system, the hop-count establishment unit 12011 receives and stores variations in the neighboring hops from a network manager. The LMD list generation unit 12012 searches ARs within a domain defined by a hop-count of the hop-count establishment unit 12011 to generate and store a list of the ARs, thereby determining the size of an LMD. The address management unit 12013 receives and stores an RCOA and an LCOA from the MN 1202 in order to transfer the RCOA to the HA.

When the MN 1202 is first introduced into a network, the LMA control unit 12021 establishes the AR to which the MN 1202 has a first access as an LMA. After the MN 1202 has moved, the LMA control unit 12021 determines the existence of the existing LMA in the LMD list of a new AR. In the case that the LMA exists in the LMD list of the new AR, the LMA control unit 12021 retains the existing LMA. Alternatively, the LMA control unit 12021 establishes the new AR as a new LMA. Then, the address register unit 12022 receives a new RCOA and LCOA in order to transfer and register to the LMA and the HA. When the MN 1202 has moved within the LMD, the address register unit 12022 transfers and registers the LCOA to the LMA, while storing the RCOA and LCOA.

According to the present invention, the use of a particular AR as an LMA by an MN may need to be limited, particularly after several moves within a same LMD, in which the same LMA is retained at each move. Thus, a timeout mechanism is preferably included as LMA service time adjustment unit 12023 in MN 1202 to allow for periodic updates of the LMA for a moving MN.

Figure 13:
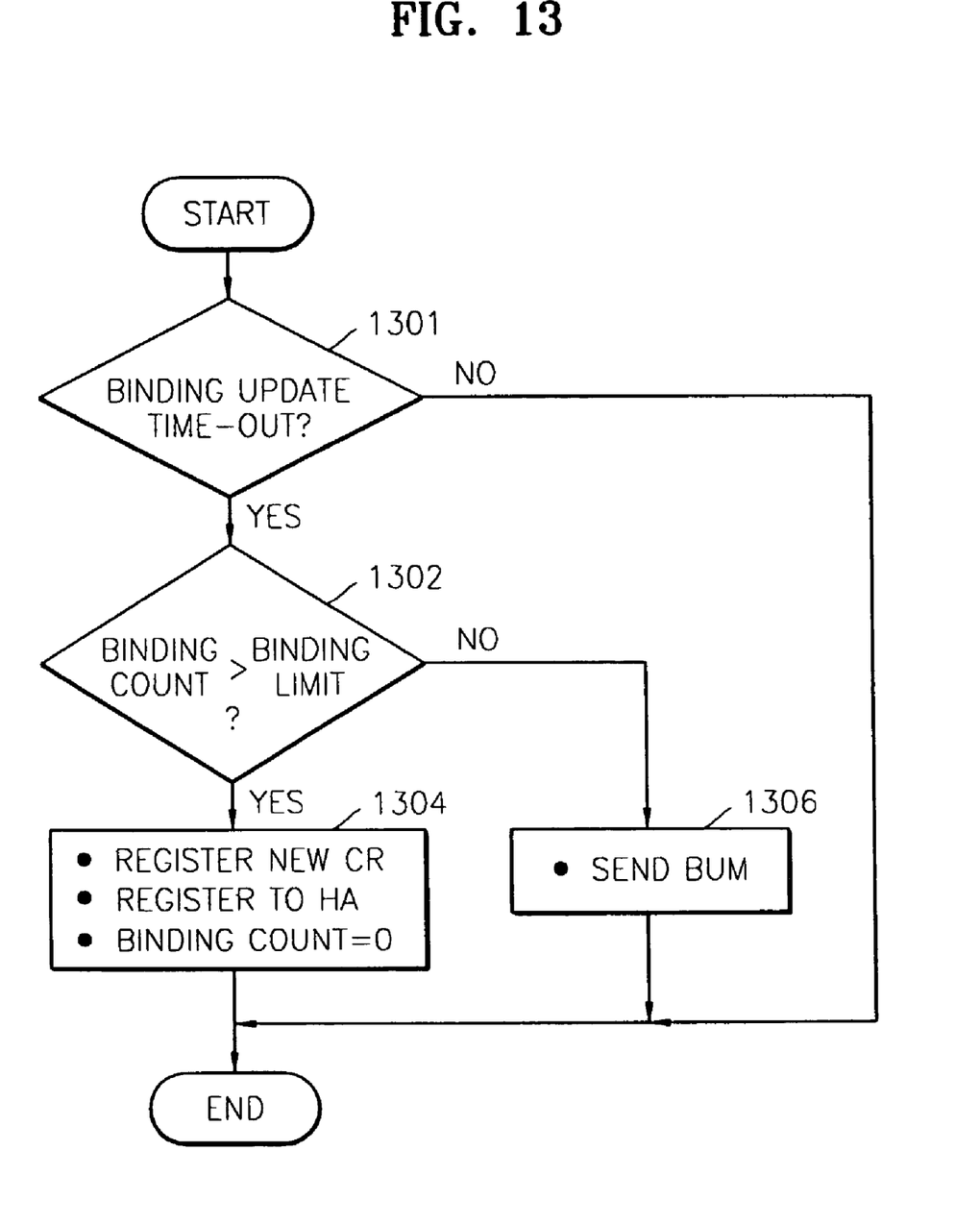
FIG. 13 illustrates a method of re-establishing an LMA due to a local mobility management time-out according to an embodiment of the present invention.

In a case where a predetermined binding lifetime (i.e., a timeout) has passed and a number of binding update messages (BUMs) that are sent to re-initialize the timeout mechanism exceeds a predetermine value, the LMA service time adjustment unit 12023 establishes the present (i.e., the latest) AR as a new LMA. FIG. 13 illustrates an exemplary operation of the LMA service time adjustment unit 12023 according to the present invention.

Referring to FIG. 13, after a local mobility management time-out (steps 1301 and 1302,) a new LMA is established in step 1304. The service time is checked by counting a time limit field of a binding update and a number of BUMs that are transferred to the LMA. After transferring a predetermined number of BUMs, the present AR becomes a new LMA and the MN registers a new address to the HA.

Specifically, in step 1301, a binding lifetime is checked to determine whether the binding lifetime has surpassed a predetermined value. If the binding lifetime has elapsed, in step 1302, the number of BUMs is tested against a predetermined binding limit. When the number of the BUMs is greater than the predetermined binding limit, the MN registers a new CR and registers a present address to the HA while initializing the number of the BUMs to zero. When the number of the BUMs is equal to or less than the predetermined binding limit, in step 1306, the MN increments the BUM count and a BUM is sent to the LMA.

The above-described present invention may be organized into a program recorded on media, so as to be operated in a common digital computer. The examples of the media include magnetic recording media, i.e., ROMs, floppy disks, and hard disks, optical recording media, i.e., CD-ROMs, and DVDs.

As a result, the present invention does not require manual establishment of an LMD and an LMA in a localized mobility management system and actively varies the LMD according to changes in the network in order to improve convenience and efficiency in a network. In addition, the AR may be used as an LMA to distribute load on the network.

In order to prevent loading on the LMA caused by the MN, a time limit for receiving service from the LMA may be set in the MN. This may be realized in the MN without affecting the network protocol in order to improve the entire performance of the network as well as the performance of the AR.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A system for establishing a local mobility agent (LMA), comprising:
   a router including:
      a hop-count establishment unit for receiving and storing a hop-count;
      a local mobility domain (LMD) list generation unit for establishing routers, which are within the stored hop-count from a present router that a mobile node (MN) first attaches to outside of a home network of the MN or first attaches to after the MN moves, as an LMD and generating and storing a list of the routers within the LMD;
      an address management unit for receiving and storing a new regional care-of-address (RCOA) and a local care-of-address (LCOA) from the MN when the present router is established as the LMA, and
   each MN including:
      an LMA control unit for deciding whether to establish the present router to which the MN has an access as the LMA and for receiving and storing the list of the routers within the LMD of the present router established as the LMA;
      an address register unit for registering the RCOA and the LCOA to a home agent (HA) and the LMA, respectively; and
      an LMA service time adjustment unit for establishing the present router to which the MN has an access as a new LMA when a binding lifetime has passed and a number of binding update messages (BUMs) exceeds a predetermined value.

2. The system as claimed in claim 1, wherein LMA is a router to which the MN first attached to outside of the home network of the MN or first attached to after the MN moved.

3. A method of forming a local mobility domain (LMD) for a mobile node (MN) based on an access router the MN attaches to outside of a home network of the MN, the method comprising:
   establishing a hop-count from a center router (CR) for a predetermined value;

generating a list of access routers (ARs) within a domain defined by the established hop-count surrounding a predetermined AR that the MN first attaches to outside of the home network of the MN or first attaches to after the MN moves;

establishing the ARs included in the list as an LMD, which has the predetermined AR as the CR; and forming a local mobility agent (LMA), including registering a new local care-of-address (LCOA) establishing the predetermined AR that the MN first attaches to as the LMA and registering a new regional care-of-address (RCOA) corresponding to the LMD having the predetermined AR as the CR to a home agent (HA).

4. The method as claimed in claim 3, wherein forming the LMA further comprises determining whether the LMA exists in an LMD list of access routers within a new LMD based on the established hop-count from an access router, which the MN has newly accessed, to register a new LCOA to the LMA, when the MN moves.

5. The method as claimed in claim 4, further comprising establishing the access router, which the MN has newly accessed, as a new LMA to register a new LCOA and RCOA to the HA and the new LMA, respectively, when the LMA is absent from the LMD list of the access routers within the LMD of the access router, which the MN has newly accessed.

6. The method as claimed in claim 3, wherein forming the LMA further comprises establishing a most recently accessed access router as a new LMA to register a new LCOA and RCOA to the HA and the new LMA, respectively, when the MN exceeds a predetermined binding lifetime and a number of binding update messages (BUMs) exceeds a predetermined value.

7. The method as claimed in claim 3, wherein each access router generates an LMD list of access routers within the established hop-count therefrom, wherein each access router has a unique LMD list.

8. The method as claimed in claim 3, wherein the hop-count is a natural number.

9. The method as claimed in claim 3, wherein the LMD list generation unit dynamically generates a respective LMD for a plurality of access routers, including the predetermined AR.

10. An article of manufacture having a recording medium including data that, when accessed by a machine, cause the machine to:

establish a hop-count from a center router (CR) for a predetermined value;

generate a list of access routers (ARs) within a domain defined by the established hop-count surrounding a predetermined AR that a mobile node (MN) first attaches to outside of a home network of the MN or first attaches to after the MN moves;

establish the ARs included in the list as a local mobility domain (LMD), which has the predetermined AR as the CR; and form a local mobility agent (LMA), including establishing registering a new local care-of-address (LCOA) establishing the predetermined AR that the MN first attaches to as the LMA and registering a new regional care-of-address (RCOA) corresponding to the LMD having the predetermined AR as the CR to a home agent (HA).

11. The article of manufacture as claimed in claim 10, further comprising data that cause the machine to determine whether the LMA exists in an LMD list of access routers of a new LMD based on the established hop-count from a present access router, which the N4N has newly accessed, to register a new LCOA to the LMA, when the MN moves.

12. The article of manufacture as claimed in claim 11, further comprising data that cause the machine to establish the present access router, which the MN has newly accessed, as a new LMA to register new LCOA and RCOA to the HA and the new LMA, respectively, when the LMA is absent from the LMD list of the access routers within the LMD of the present access router, which the MN has newly accessed.

13. The article of manufacture as claimed in claim 10, further comprising data that cause the machine to establish a most recently accessed access router as a new LMA to register a new LCOA and RCOA to the HA and the new LMA, respectively, when the MN exceeds a predetermined binding lifetime and a number of binding update messages (BUMs) exceeds a predetermined value.

14. The article of manufacture as claimed in claim 10, further comprising data that cause the machine to generate, for each access router, an LMD list of access routers within the established hop-count therefrom, wherein each access router has a unique LMD list.

15. The article of manufacture as claimed in claim 10, wherein the LMD list generation unit dynamically generates a respective LMD for a plurality of access routers, including the predetermined AR.

* * * * *